US008269885B2

(12) United States Patent
Zhou et al.

(10) Patent No.: US 8,269,885 B2
(45) Date of Patent: Sep. 18, 2012

(54) FADE IN/FADE-OUT FALLBACK IN FRAME RATE CONVERSION AND MOTION JUDDER CANCELLATION

(75) Inventors: Zhi Zhou, Irvine, CA (US); Yeongtaeg Kim, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 719 days.

(21) Appl. No.: 12/418,528

(22) Filed: Apr. 3, 2009

(65) Prior Publication Data

US 2010/0253835 A1    Oct. 7, 2010

(51) Int. Cl.
    *H04N 7/01*    (2006.01)
(52) U.S. Cl. ........ 348/441; 348/699; 348/700; 348/722; 348/595; 382/170; 382/236; 382/274; 375/240.12; 375/240
(58) Field of Classification Search .................. 348/441, 348/699, 700, 722, 595; 382/170, 236, 274; 375/240.12, 240
    See application file for complete search history.

(56) References Cited

U.S. PATENT DOCUMENTS

| | | | | |
|---|---|---|---|---|
| 5,057,921 A | * | 10/1991 | Robert et al. | 348/459 |
| 6,084,641 A | * | 7/2000 | Wu | 348/722 |
| 6,810,145 B2 | * | 10/2004 | Briand et al. | 382/170 |
| 7,277,486 B2 | * | 10/2007 | Srinivasan et al. | 375/240.12 |
| 7,463,684 B2 | * | 12/2008 | Srinivasan et al. | 375/240.12 |
| 7,609,767 B2 | * | 10/2009 | Srinivasan et al. | 375/240.25 |
| 2001/0004403 A1 | * | 6/2001 | Warnick et al. | 382/173 |
| 2002/0031178 A1 | * | 3/2002 | Isozaki | 375/240.12 |
| 2002/0033901 A1 | * | 3/2002 | Martin | 348/699 |
| 2003/0206583 A1 | * | 11/2003 | Srinivasan et al. | 375/240.01 |
| 2003/0206592 A1 | * | 11/2003 | Srinivasan et al. | 375/240.16 |
| 2003/0206593 A1 | * | 11/2003 | Srinivasan et al. | 375/240.16 |
| 2004/0252230 A1 | * | 12/2004 | Winder | 348/402.1 |
| 2004/0252759 A1 | * | 12/2004 | John Winder et al. | 375/240.12 |
| 2005/0053155 A1 | * | 3/2005 | Holcomb et al. | 375/240.23 |
| 2006/0146932 A1 | * | 7/2006 | Panusopone et al. | 375/240.12 |
| 2007/0058719 A1 | * | 3/2007 | Date et al. | 375/240.12 |
| 2008/0089404 A1 | * | 4/2008 | Okazaki et al. | 375/240 |
| 2008/0131021 A1 | * | 6/2008 | Fukuda | 382/274 |
| 2008/0247656 A1 | * | 10/2008 | Bock et al. | 382/236 |
| 2009/0086814 A1 | * | 4/2009 | Leontaris et al. | 375/240.02 |

OTHER PUBLICATIONS

Adaptive Bi-Predictive Video Coding Using Temporal Extrapolation, Koto et al., Image Processing, Sep. 2003, pp. III-829-32 vol. 2.*

* cited by examiner

*Primary Examiner* — Jefferey Harold
*Assistant Examiner* — Sam Huang

(57) ABSTRACT

A system and method for determining a pixel characteristic of pixels in interpolated frames. Preceding and successive frames are evaluated to determine if there is a frame-wide change occurring to the pixels. To the extent there is a frame-wide change, the pixel characteristic in interpolated frames is accommodated by the frame-wide change. In one implementation, frame-wide changes in luminance, such as fade in and fade out, are detected and the pixel characteristic of pixels in the interpolated frame is determined based at least in part on fallback techniques rather than motion compensation interpolation.

35 Claims, 8 Drawing Sheets

FADE IN/FADE-OUT FALLBACK IN FRAME RATE CONVERSION AND MOTION JUDDER CANCELLATION

BACKGROUND OF THE INVENTION

1. Field of the Invention

The present invention relates to video data processing and, in particular, concerns frame rate conversion of digital video data in circumstances where the video data exhibits frame-wide changes between different frames, such as, for example, frame-wide changes in pixel intensity due to fade in or fade out.

2. Description of the Related Art

Frame rate conversion is a common occurrence with video data processing. Often, the original frame rate at which video data is recorded differs from the frame rate of a subsequent displaying device. In these circumstances, it is often desirable to generate new frames from the original video data in order to match the frame rate of the subsequent displaying device. Often these new frames are inserted or interpolated in between original frames so that the motion of objects within the frames appears smoother and more continuous.

Typically, when a frame is to be generated, or interpolated, the display device will have to determine the luminance of objects or pixels in the interpolated frame. Some objects or pixels are stationary from frame to frame and others are moving. The luminance of any object in the interpolated frame may thus correspond to a stationary object or a motion object. One technique for determining the luminance of objects in the interpolated frame is motion compensated interpolation, a procedure where the relative positions of the moving objects in the original frames are evaluated to determine a motion vector of the moving object which can be used to generate the interpolated frame.

In many circumstances, motion objects are identified in successive frames in the original video data by determining an identifiable characteristic, such as the luminance, of the pixels comprising the moving object in one or more original frames and then looking for a group of pixels having the same or similar characteristic in successive frames. In this way, the vector of the moving objects can be determined in successive frames. Once the vector of the moving objects in successive frames have been determined, this information may be used to determine the luminance of objects in the interpolated frame if they correspond to the vector. In one implementation, a linear regression technique can be used to determine the motion vector of the motion object based upon the two succeeding frames. In other implementations, multiple frames can be analyzed and used to determine the vector of the motion object.

One difficulty that occurs when performing this type of identification of moving objects is that the overall characteristics of the frame, such as luminance, can also vary. This circumstance can particularly occur when the frame is fading in or out, e.g. the overall luminance of all or substantially all of the pixels is changing in the entire frame. When this type of change does occur, pixels or groups of pixels in the successive frames can end up with the same or similar luminance values as unrelated pixels or groups of pixels in the previous frames causing the unrelated pixels or groups of pixels to be identified as the moving object which can lead to an incorrect determination of the motion vector of motion objects and misassignment of the luminance of objects in the interpolated frame. This circumstance is graphically illustrated in FIG. 1.

As shown, motion objects in a previous frame (n−1) have a luminance of 100 and 80 respectively as determined by well-known processing techniques, such as sum of absolute differences (SAD). During fade in or fade out, there may be a uniform loss of luminance of 20 for substantially all of the pixels in the successive frame (n) resulting in the two motion objects having respective values of 80 and 60. In this circumstance, the motion object in the original frame (n−1) having the value of 80 will be assumed to be the motion object which has the value of 80 in the successive frame (n) even though this is actually the motion object that in the preceding frame (n−1) had a value of 100 thus resulting in an erroneous motion vector. Thus, in any new frame that is created between the frames (n−1) and (n), the objects that are intersected by the erroneous motion vector will be assigned the wrong luminance value. This can result in visual distortions and artifacts being introduced into the video stream thereby lowering the quality of the image.

From the foregoing, it will be appreciated that there is a need for improved process for determining the vectors of moving objects in a video stream and determining luminance values of objects in interpolated frames. To this end, there is a need for a better process for determining luminance values in interpolated frames that accounts for global changes in the video images between frames such as the image fading in and fading out.

SUMMARY OF THE INVENTION

The aforementioned needs are satisfied by the present invention which, in one specific embodiment, comprises a system for converting video data from a first format to a second format wherein conversion of the first format into the second format includes interpolating frames of video data between existing frames of video data in the first format. In this embodiment, the system comprises at least one processor that receives video data in the first format, and wherein the system reviews at least one pixel characteristic to identify vectors of motion objects in the first format frames to thereby use this information to determine pixel characteristic values of pixels or objects in one or more interpolated frames in the second format. In this embodiment, the system further evaluates the pixel characteristic in first format frames adjacent the interpolated frame and determines whether the at least one pixel characteristic is changing for a pre-selected threshold number of pixels between frames. In this embodiment the system adopts a first process for determining the characteristic values of pixels or objects in the interpolated frame when the pixel characteristic is changing for more than the pre-selected threshold number of pixels. In this embodiment, the system adopts a second process for determining the pixel characteristic value of pixels or objects in the interpolated frame when the pixel characteristic is changing for less than the pre-selected threshold number of pixels.

In one specific implementation, the pixel characteristic comprises luminance. In one specific implementation, motion compensation interpolation is used to determine the luminance of objects in the interpolated frame. In another implementation, fallback, or a combination of fallback and motion compensation interpolation is used to determine the luminance of objects in the interpolated frame.

In another embodiment, the invention comprises a system for converting a stream of video frames in a first format into a stream of video frames in a second format, wherein the second format includes frames corresponding to the frames of the first format and interpolated frames that are created based upon the frames of the first format and wherein the frames of the first format include at least some frames having motion objects. In this embodiment, the system determines pixel characteristics of pixels or objects in an interpolated frame by using a pixel characteristic to identify the motion object in frames of the first format adjacent to the frame to be interpolated and determine a motion vector therefrom. The system further evaluates the pixel characteristic in the frames adjacent the frame to be interpolated to determine if the pixel characteristic is changing for a threshold number of pixels within the frame. The system further adjusts the determination of the pixel characteristic of pixels or objects in the interpolated frame when the system determines that the pixel characteristic is changing for a threshold number of pixels within the frames.

In yet another embodiment, the invention comprises a method of creating a second format of video data arranged into a plurality of frames. This method comprises receiving a stream of video data in a first format, identifying one or more motion objects in the first format stream of video data, evaluating at least one pixel characteristic of the first format stream of video data, determining whether the at least one pixel characteristic of the pixels of at least two of the frames in the first format stream of video data is changing for a pre-selected threshold number of pixels between the frames of the first format stream of video data, interpolating a frame between the at least two of the frames of the first format stream of video data to create the second format stream of video data; using a first process to determine a pixel characteristic of pixels or objects in the interpolated frame if the pixel characteristics of the at least two frames of the first format stream of video data is changing for a pre-selected threshold number of pixels between the at least two frames, and using a second process to determine a pixel characteristic of pixels or objects in the interpolated frame if the pixel characteristics of the at least two frames of the first format stream of video data is changing for a pre-selected threshold number of pixels between the at least two frames.

These and other objects and advantages will become more apparent from the following description taken in conjunction with the accompanying drawings.

DETAILED DESCRIPTION OF THE PREFERRED EMBODIMENT

Figure 1:
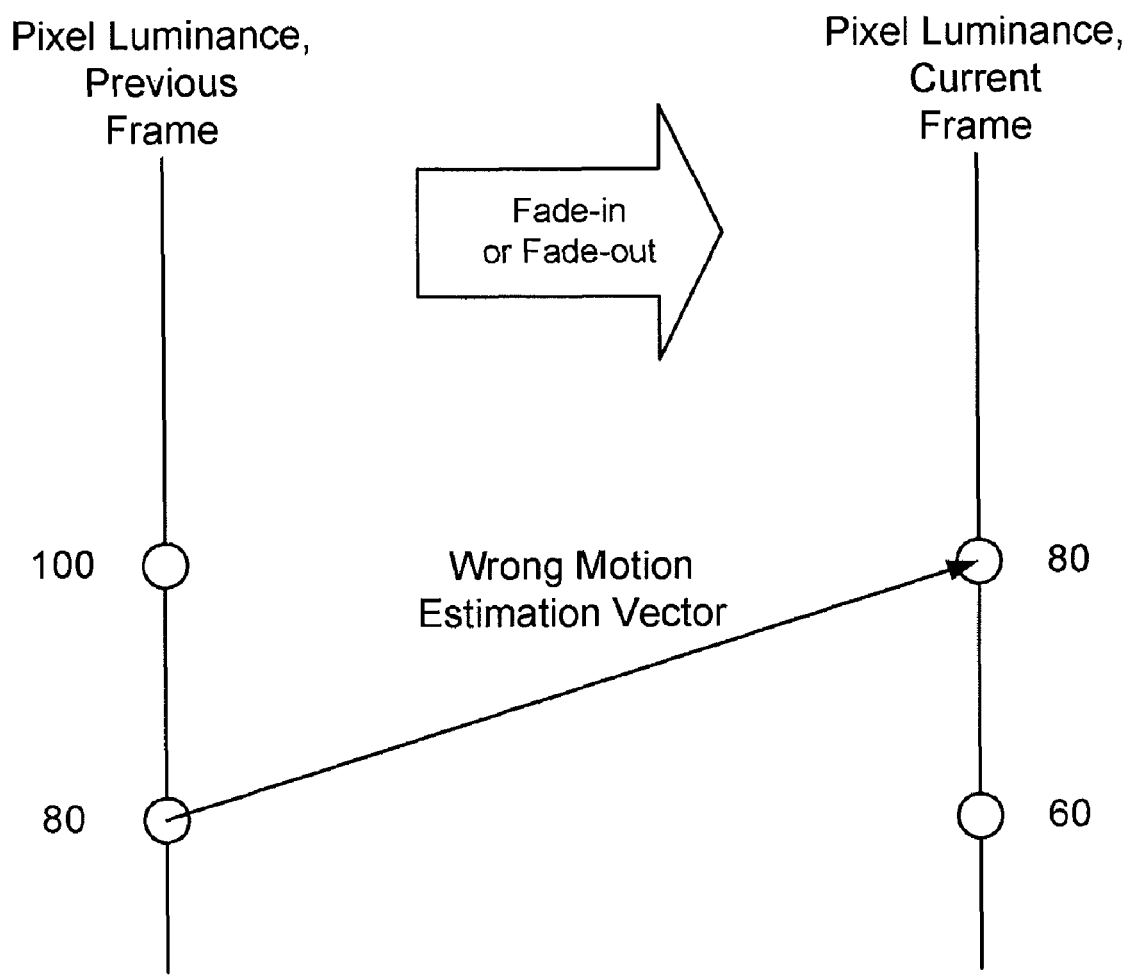
FIG. 1 is a diagram illustrating the difficulties associated with performing motion estimation between frames where the frames are experiencing a global change such as fade in or fade out.
Figure 2:
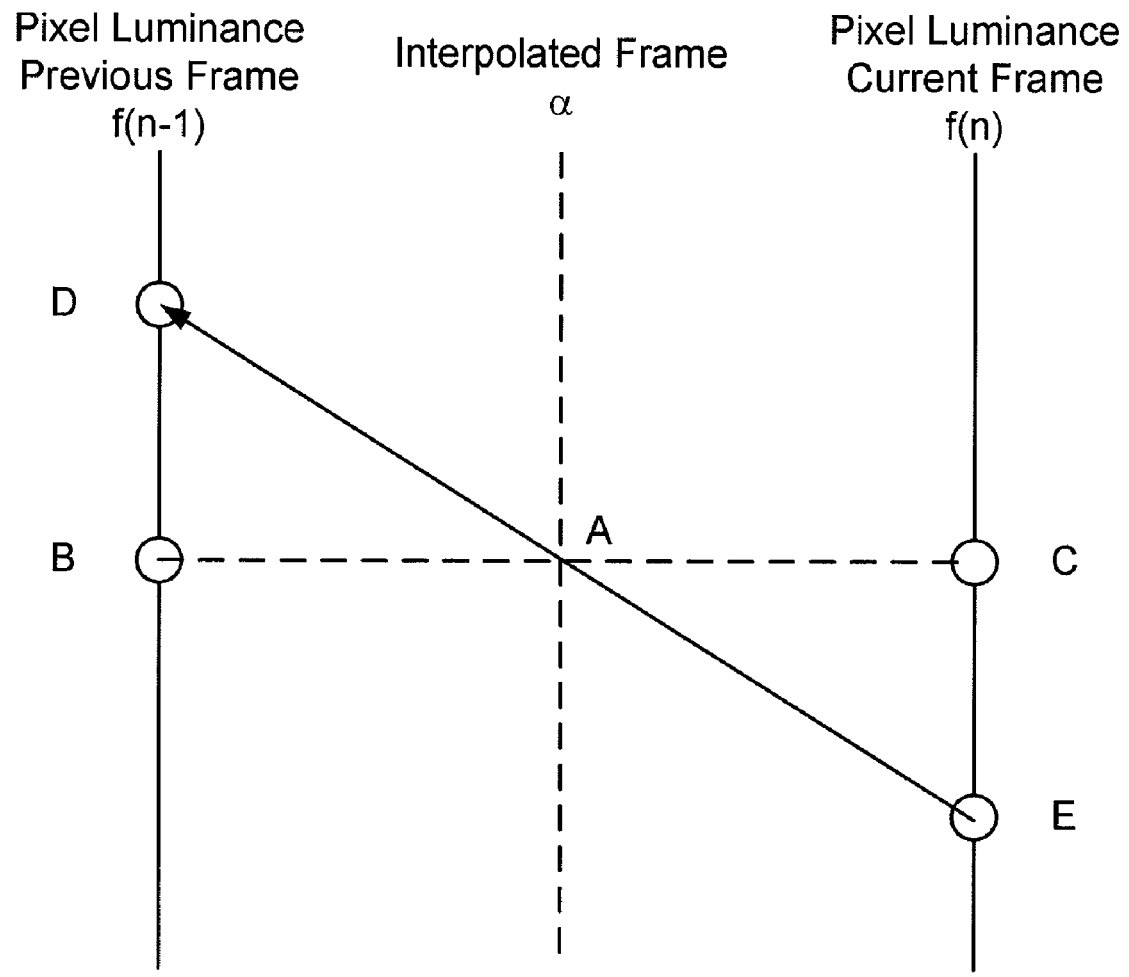
FIG. 2 is a diagram illustrating determining the luminance of objects in an interpolated frame using either motion compensated interpolation techniques or fallback techniques.

Reference will now be made to the drawings wherein like numerals refer to like parts throughout. Referring initially to FIG. 2, the problem that is being addressed by this embodiment is illustrated. As shown, in a preceding frame f(n−1), there are two motion objects B, D shown. In the next frame f(n) there are two motion objects C, E shown. An identifying characteristic of the motion objects, such as luminance, in each of the frames may or may not be changing over the entire frame. While the following discussion discuses pixel luminance as a characteristic of fade in and fade out, it will be appreciated that any of a number of pixel characteristics can be changing that could affect motion estimation without departing from the spirit of the present invention.

If the pixel luminance is not globally changing, then a known motion compensated interpolation can be performed using the location of the motion object D in the frame (n−1) and the location of the motion object E in frame (n) to determine a vector between objects D and E. The luminance of the object D and E in the two frames should correspond to each other to allow the system 100 to identify these objects as the same from frame to frame. This luminance value allows for the determination of the vector between the frames (n−1) and (n) and further, the intersection of the vector in the interpolated frame a allows for a determination of the luminance values of pixels or objects at that location within the interpolated frame α.

However, if the pixel luminance is globally changing for all the pixels in the frame between the frames (n−1) and (n), then different motion objects may be viewed as corresponding to each other between the frames. In this case, the motion vector between the frame (n−1) and (n) may be erroneously determined and performing a known motion compensated interpolation to determine the luminance of a pixel or object A in the interpolated frame a could yield an erroneous result. In this circumstance, it may be more desirable to determine the luminance of object A in the interpolated frame a using a fallback method such as temporal interpolation between objects B in the previous frame (n−1) and C in the current frame (n) to determine the luminance at A or by simply repeating the luminance of B of the previous frame (n−1). Thus, the initial issue is to determine when a global change is occurring to all of the pixels in the frame that could result in an erroneously calculated motion vector. Once a global, or frame-wide change has been detected, then the appropriate amount of fallback and/or motion compensated interpolation must then be selected to obtain a better determination of the luminance for the object A in the interpolated frame a.

It will be appreciated that, in some circumstances, there will be both motion objects and also global changes between frames that result in differing appearances for the frames. For example, when the intensity is fading between one frame and the next, there may still be objects moving between the frames so determining whether the luminance of objects in an interpolated frame as corresponding to motion objects or to stationary objects will be best achieved by a combination of motion compensation interpolation and fallback.

Figure 3:
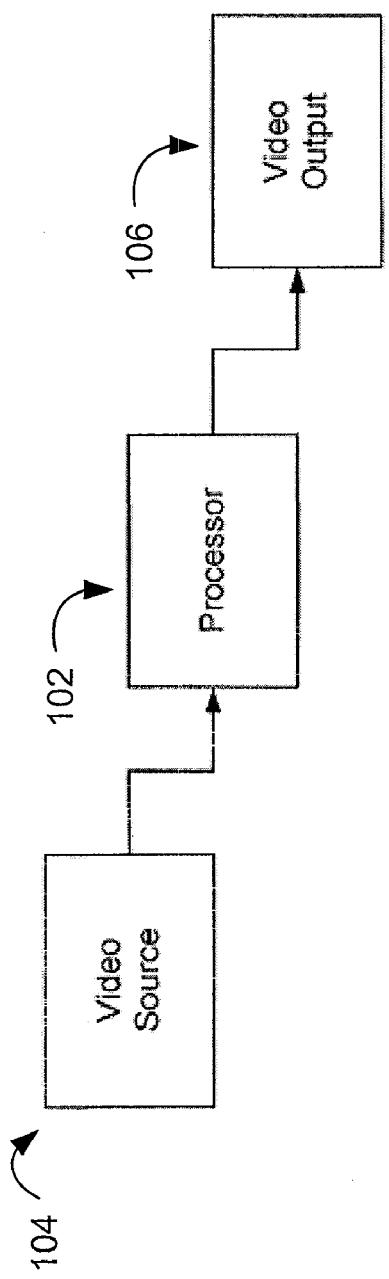
FIG. 3 is a simplified block diagram illustrating a system for performing motion compensated interpolation and fallback techniques on a video stream.
Figure 4:
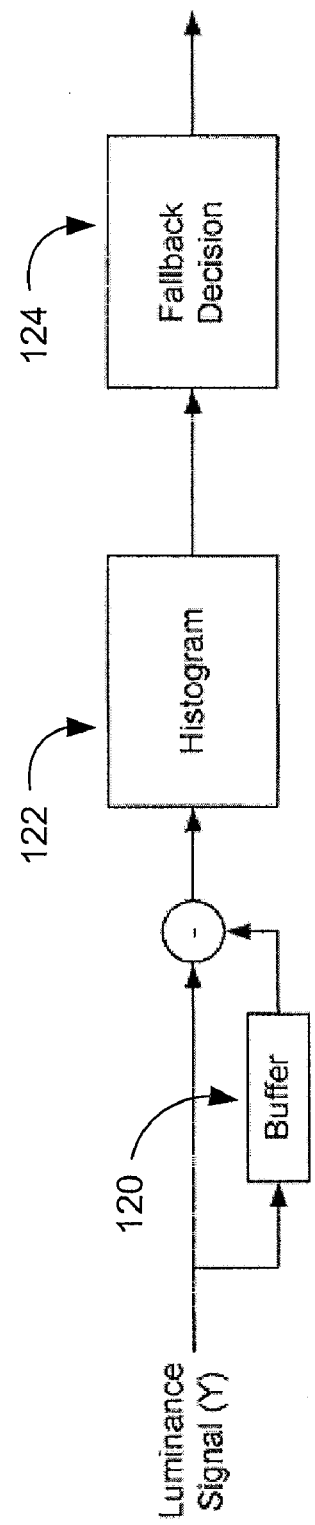
FIG. 4 is a functional block diagram illustrating a process whereby a level of fallback or motion estimation is determined by the system of FIG. 3.

Referring now to FIGS. 3 and 4, an exemplary system 100 for processing video data to accommodate more global changes in the frames while performing motion estimation for interpolated frames are disclosed. As shown in FIG. 3, video signals, comprising a plurality of frames is received by one or more processors 102 from a video source 104. Generally, the video signals received from the source 102 are received in a first format and the processor 102 processes the video signals into a second format which may require the interpolation of frames to thereby determine the luminance of objects in the interpolated frames.

Once the processor 102 performs the video processing, the processor 102 then outputs the new video signal via a video output 106. Generally, the video data at the output 106 includes interpolated frames that have been generated by the processor 102 by evaluating one or a plurality of frames preceding and succeeding the interpolated frames. The interpolated frames are generated so that the video output 106 is providing video data at new recognized format with the appropriate numbers of frames per minute etc.

As discussed above, certain objects in the frames are moving from frame to frame. In one specific implementation, moving objects are identified from frame to frame for vector calculation by evaluating the luminance, Y, of the objects using well known techniques such as determining the sum of the absolute differences (SAD) of the particular object. It will be appreciated that other characteristics of objects can also be used to identify the object from frame to frame including, but not limited to, the colors red, green, blue (R, G, B), as well as the hue U and the saturation V. It will also be appreciated that various global changes can be occurring in the characteristic that is being used to identify the motion objects in successive frames that could result in the same mis-identification of objects in successive frames and miscalculation of vectors as discussed above. As such, the following discussion relating to the use of luminance is simply exemplary of a process that could be applied to any of a number of similar characteristics that could be used to identify motion objects.

As shown in FIG. 4, the processor 102 is logically organized so that when the video data is received, each frame is buffered in a buffer 120 so that the luminance change of all the pixels in the frame can be determined on a frame by frame basis. This overall change is then computed into a histogram 122 which illustrates the extent to which the luminance changes for all the pixels between the frames. For global changes between frames, such as fade in or fade out, the difference for each pixel between the current frame and the previous frame is very similar. Thus, by obtaining a histogram of the difference between a characteristic, such as luminance, for all pixels in a successive frame a determination can be made as to what extent a global change is occurring, which can dictate to what extent motion compensation interpolation or fallback should be used to determine the luminance of objects in the interpolated frames. Once the histogram is obtained, the processor 102 can then determine, in block 124, the level of fallback or motion compensation interpolation that should be used to determine the luminance of objects in the interpolated frame. As will be discussed in greater detail below, the extent to which the change in intensity is concentrated about a particular value of the histogram is indicative of the level of global change that is occurring between frames. The global change in luminance between frames then dictates the extent to which an object's luminance in an interpolated frame should be determined by fallback, such as temporal interpolation, or using the previous position, or by motion compensation interpolation.

Figures 1, 5:
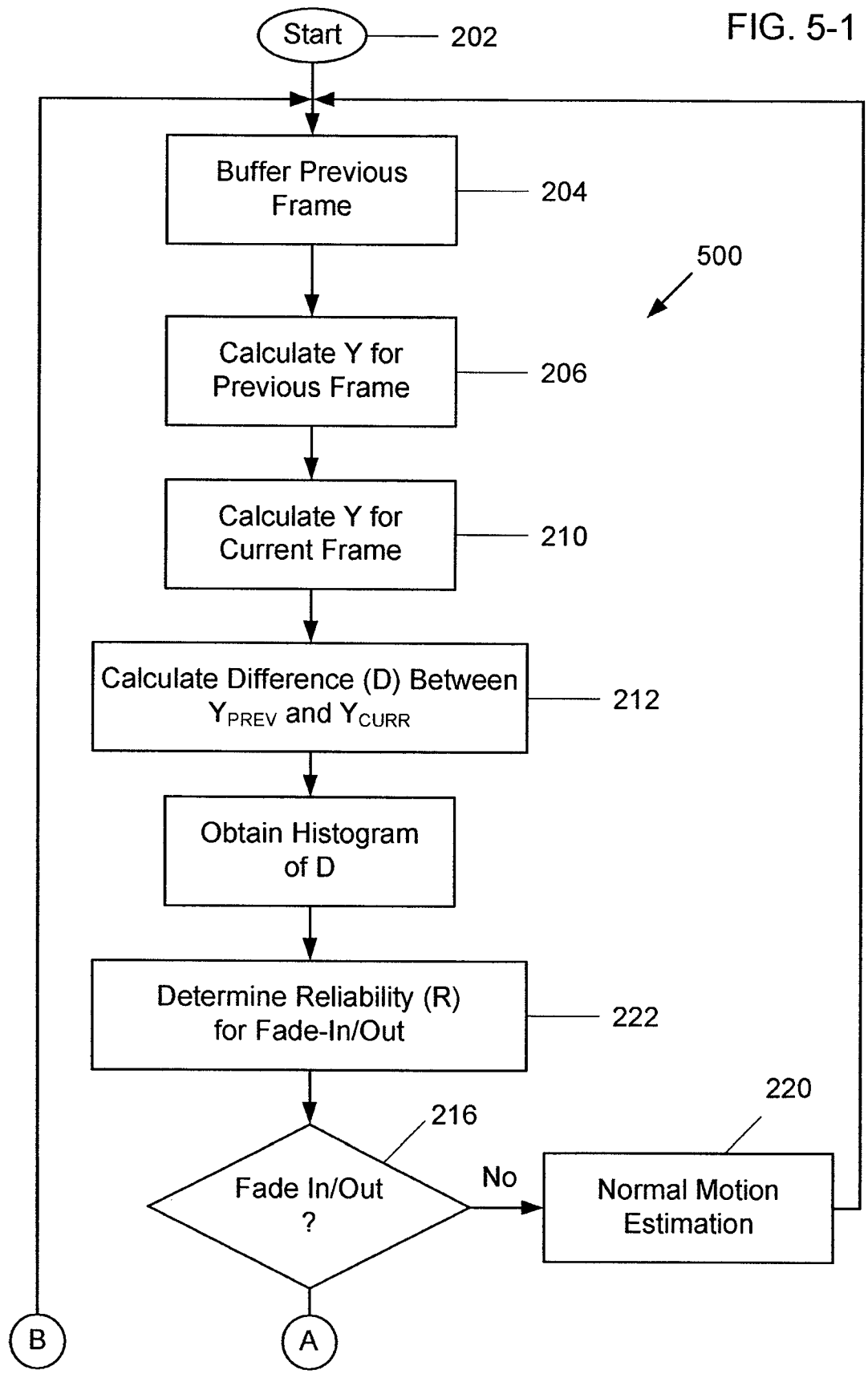
FIG. 5 is a flowchart illustrating the process of FIG. 4 in greater detail.
Figures 2, 5:
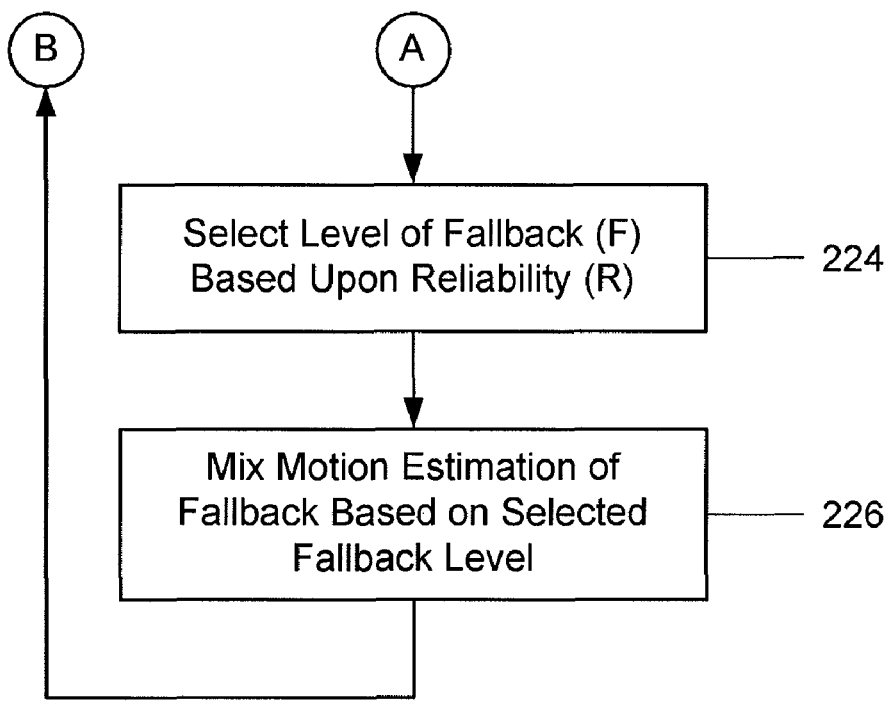

FIG. 5 is a flow chart that illustrates an exemplary process 200 by which a global change, such as fade in or fade out, is detected as occurring between frames and accommodated when generating interpolated frames. As shown in FIG. 5, the processor 102, from a start state 202, proceeds to buffer in state 204 the previous frame (n−1) (or frames) in the buffer 120 (FIG. 4). The luminance Y of the previous frame (or frames) is then calculated in state 206. Subsequently, the next or current frame (n) is then received and the luminance Y of the current frame (n) is then calculated in state 210. Then, in state 212, the difference D between Y(n) and Y(n−1) is then calculated for corresponding pixels. Subsequently, the difference values are plotted on a histogram in state 214.

Figure 6A:
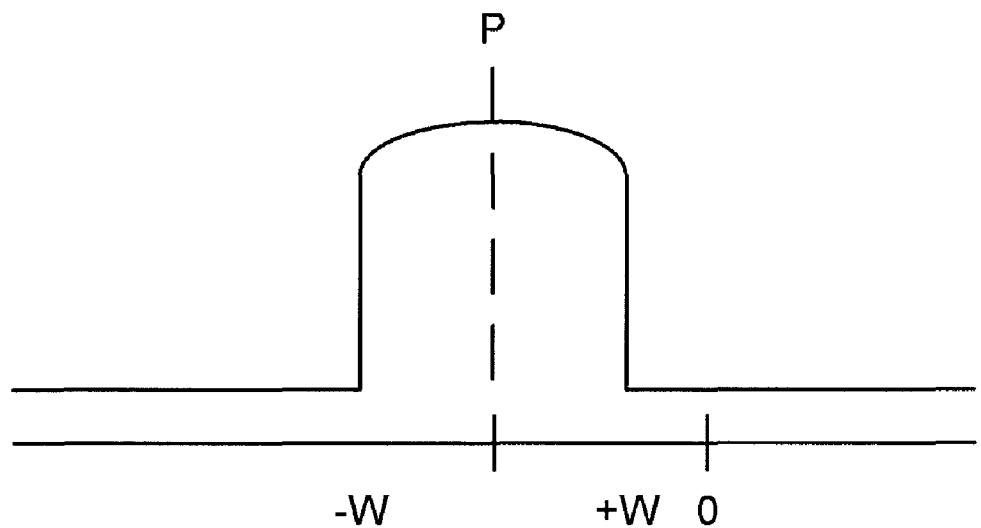
FIG. 6A-6C are graphical illustrations of functional aspects of the process of FIG. 5.

As shown in FIG. 6A, if the frames (n) and (n−1) are experiencing a global change, such as fade in or fade out, the differences of the luminance values for all corresponding pixels, when illustrated in the histogram obtained in state 214, will have a similar difference value, e.g., will be within a certain threshold range [P−w, P+w] of a peak value P. A reliability factor R can then be determined in state 220. The reliability factor R is representative of the degree of global change in the luminance values for all pixels within the frame which provides an indication of the extent to which identification of motion objects between the frames based on luminance is reliable. Thus, once the histogram of the differences is obtained, it is then determined, in decision state 216, whether the histogram of the difference D indicates that a global change is affecting a threshold of pixels, such as all or substantially all of the pixels, is occurring between the frames (n) and (n−1).

In one implementation, this determination is made by determining a count C of the pixels that fall within a preselected threshold range −w to +w and then determining what ratio R the count C is over the total number of pixels T in the frames that are within the threshold range:

$$R = C/T \quad (1)$$

Figure 6B:
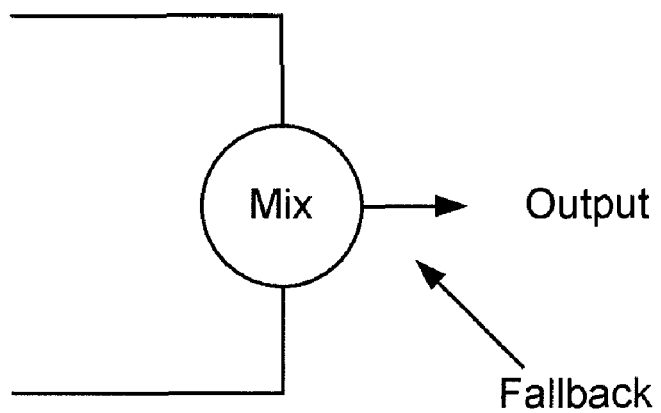
Figure 6C:
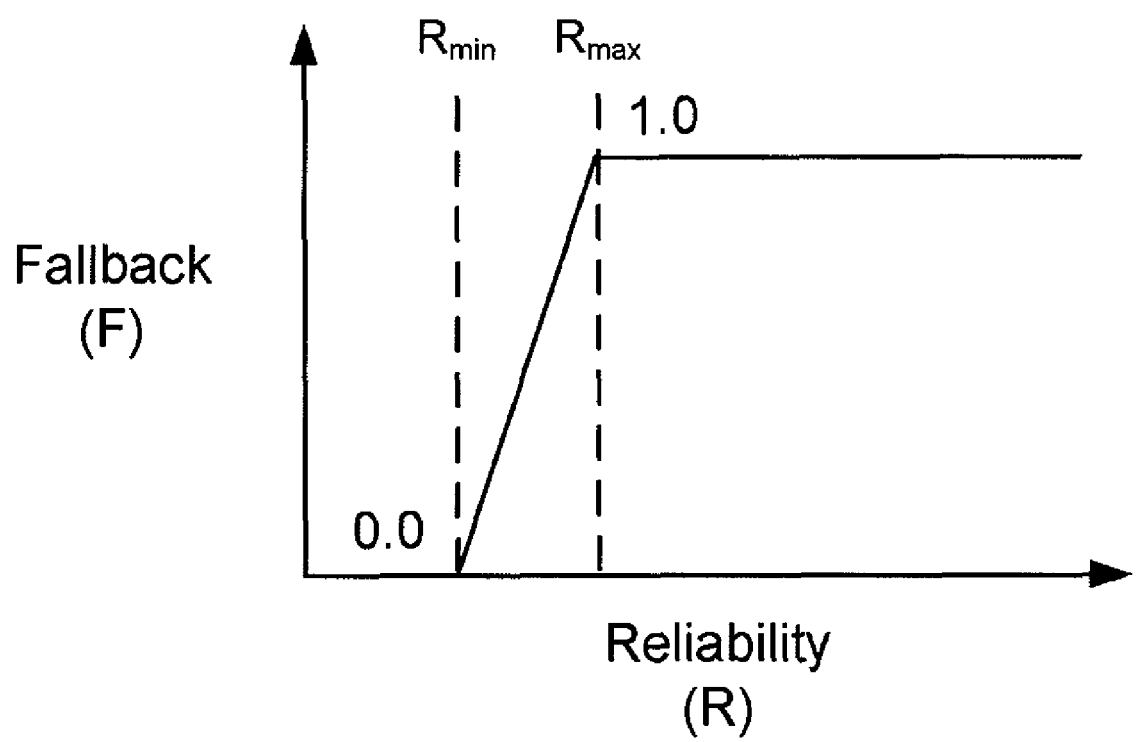

If the ratio R exceeds a pre-selected threshold, e.g. $R_{max}$ in FIG. 6C, it can be determined in decision state 216 that there is a global change such as fade in or fade out that is occurring. This implies that any calculated motion vector is less reliable and should not be used to determine the luminance of an object in the interpolated frame that is intersected by the motion vector. In this case a fallback technique, such as temporal interpolation or repeating the previous luminance of the object in a previous frame, should be used to determine the luminance of an object in the interpolated frame that would otherwise be intersected by the motion vector. Alternatively, if the ratio is less than a pre-selected threshold e.g. $R_{min}$ in FIG. 6C, then there is not a significant level of global change such as fade in or fade out and the motion vector between frames (n−1) and (n) is reliable. In this case, a known motion estimation interpolation using the motion vector should be performed in state 220 to determine the luminance of motion objects in any interpolated frame.

In some circumstances, the ratio R is between $R_{min}$ and $R_{max}$ which infers that some global change is occurring but that there is also some change in intensity of pixels between the pixels that are attributable to movement of motion objects. In this circumstance, as shown in FIG. 6B, the processor 102 selects, in state 224, a level of fallback F according to a pre-set criteria, such as the curve of FIG. 6C, or by mixing motion estimation interpolation and fallback according to a formula such as:

$$A = \beta A1 + (1-\beta)(A2 \text{ or } A3) \quad (2)$$

where A is the output pixel value, e.g., luminance value, of an arbitrary pixel or group of pixels in the interpolated frame α, β is a weighting value, such as the weighting value provided by the curve of FIG. 6C between Rmin and Rmax, A1 is the pixel value, e.g., luminance value, of the pixel or group of pixels obtained using motion compensated interpolation, A2 is the pixel value e.g., luminance value, of a pixel or group of pixels obtained using temporal interpolation and A3 is the pixel value, e.g., luminance value, of a pixel or group of pixels obtained by copying the value from the previous frame at the same position. According to Formula (2) the output pixel value can be a linear average between the motion estimation interpolation and one or more fallback determination of the location of the motion object A in the interpolated frame.

It will be appreciated that any of a number of different weightings between temporal interpolation A2, repeat A3, and the motion estimation interpolation A1 can be implemented without departing from the spirit of the present invention. In short, this implementation determines initially to what extent are the pixels in successive frames changing as a result of a frame-wide change, such as fade in or fade out, and then incorporates this change into the creation of interpolated frames. To the extent that the changes are the result of global changes, motion estimation interpolation is reduced thereby reducing potential sources of error stemming from incorrectly calculating the motion vector due to frame-wide changes.

The foregoing discussion has described a process of determining a pixel characteristic of one or more pixels or objects using motion compensated interpolation and fallback techniques, such as temporal interpolation, etc. based upon a determined fallback level. It will be appreciated that the determined fallback level can be used as a basis for determining pixel characteristics in other manners as well.

Figure 7:
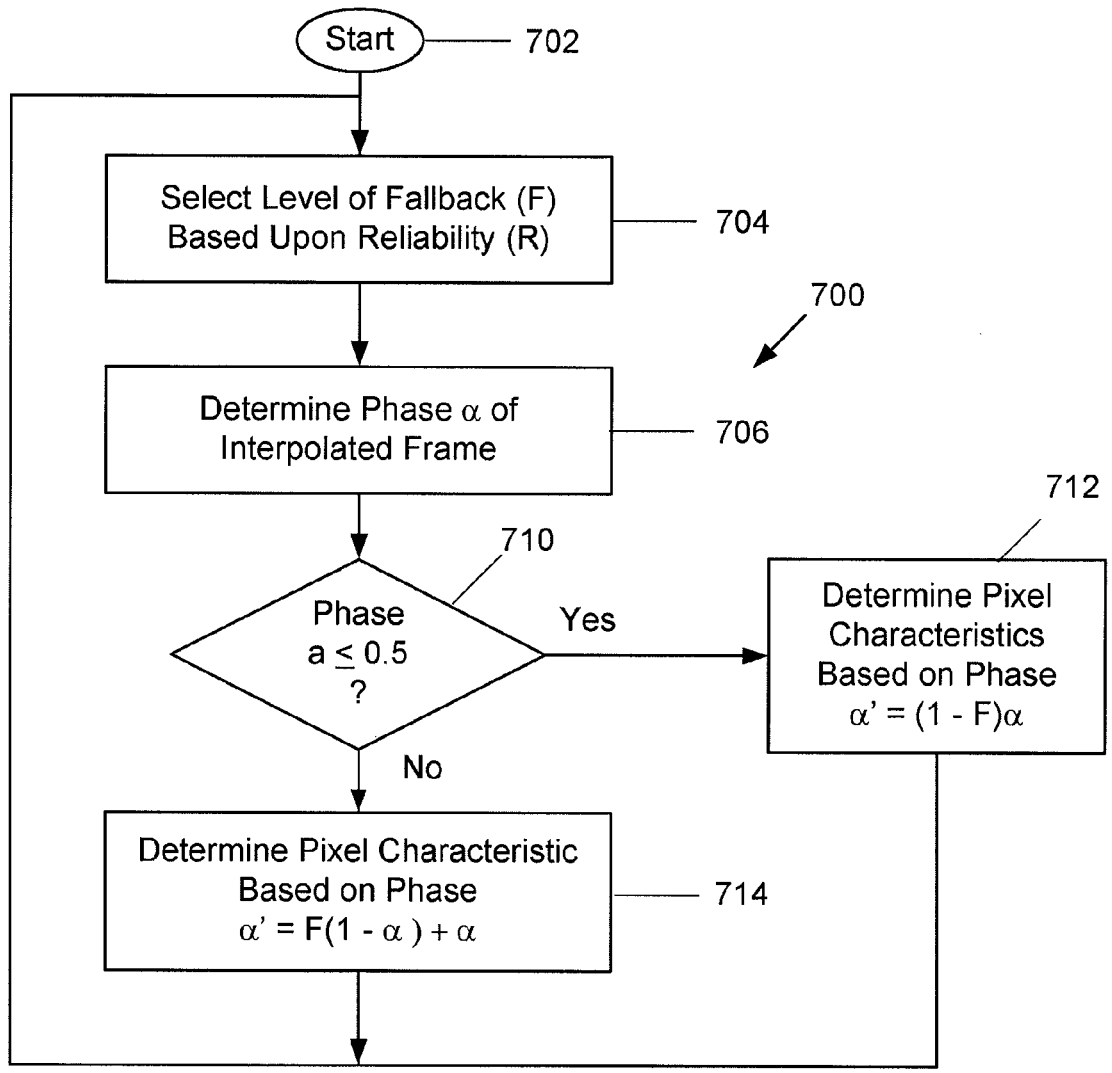
FIG. 7 is a flowchart illustrating an alternative process for determining luminance of pixels or objects in an interpolated frame.

For example, FIG. 7 is a flow chart that illustrates a process 700 whereby the pixel characteristic, such as luminance, of a pixel or group of pixels or object of an interpolated frame can be determined by adjusting the phase of the interpolated frame based upon the determined level of fallback. Referring specifically to FIG. 7, from a start state 702, a level of fallback F is selected based upon the reliability R in state 704. This determination of the level of fallback F and reliability R can be substantially the same as discussed above in conjunction with FIG. 5.

Once the level of fallback F has been determined, the processor 102 then determines in state 706, the phase a of the frame that is being interpolated into the video stream. The phase is the relative time-based position of the interpolated frame between the current frame (n) and the preceding frame (n−1). The phase position can be determined in any of a number of ways but generally is being selected so that the resultant video stream complies with a new desired video format. Subsequently, the processor 102 then determines, in decision state 710, whether the phase α of the interpolated frame α is greater than a predetermined value. In this implementation, the processor 102 is determining whether the interpolated frame α is closer to frame (n) or frame (n−1).

If the processor 102 determines, in this particular implementation, that the frame is closer to the frame (n−1), e.g. the phase α is less than or equal to 0.5, then the pixel characteristic is determined in state 712 based upon an adjusted phase α' as determined according to the following formula (3):

$$\alpha' = (1-F)\alpha \quad (3)$$

In this circumstance, if the fallback F is equal to zero, then the pixel characteristic will be determined at the phase α using, for example, the motion compensated interpolation techniques as described above. In this circumstance, if the fallback F is equal to 1, indicating total fallback, then the pixel characteristic is determined using the corresponding pixel characteristic of the previous frame (n−1). If the fallback level F falls between 0 and 1, then an arithmetic combination of the motion compensated interpolation determination of the pixel characteristic and the pixel characteristic of the previous frame can then be used.

Alternatively, if the processor 102 determines that the phase α is closer to the frame (n−1), e.g. the phase α is greater than 0.5, then the pixel characteristic is determined in state 714 based upon an adjusted phase α' as determined according to the following formula (4):

$$\alpha' = F(1-\alpha) + \alpha \quad (4)$$

In this circumstance, if the fallback F is equal to zero, then the pixel characteristic will be determined at the phase α using, for example, the motion compensated interpolation techniques as described above. In this circumstance, if the fallback is equal to 1, indicating total fallback then the pixel characteristic is determined using the corresponding pixel characteristic of the current frame (n). If the fallback level F is between 0 and 1, then an arithmetic combination of the motion compensated interpolation determination of the pixel characteristic and the pixel characteristic of the current frame (n) can then be used.

While the foregoing description has shown, illustrated and described the fundamental novel features of the present teachings, it will be apparent that various omissions, substitutions and changes to the form of the detail of the apparatus as illustrated, as well as the uses thereof may be made by those of ordinary skill in the art without departing from the scope of the present teachings. Hence the scope of the present teachings should not be limited to the foregoing discussion, but should be defined by the appended claims.

What is claimed is:

1. A system for converting video data comprising:
   a video source with the video data having a first format frame according to a first format;
   a processor, coupled to the video source, for:
      receiving the video data having one or more motion objects in the first format;
      determining whether a number of pixels having at least one pixel characteristic in one of the motion objects changing between frames is more or less than a pre-selected threshold number of pixels; and
      selecting a first process for determining a pixel characteristic of a pixel in an interpolated frame adjacent to the first format frame when the number of pixels having at least one pixel characteristic changing between frames is more than the pre-selected threshold number of pixels within the first format frame or a second process when the number of pixels having at least one pixel characteristic changing between frames is less than the pre-selected threshold number of pixels.

2. The system of claim 1, wherein the processor is for selecting the first process or the second process based on the pixel characteristic including luminance.

3. The system of claim 1, wherein the processor is for determining a difference D in the pixel characteristic for at least some of the pixels between frames in the first format.

4. The system of claim 3, wherein the processor is for determining a number of pixels C having the difference D within a pre-selected threshold −W to +W of a peak difference value P for all measured pixels.

5. The system of claim 4, wherein the processor is for selecting the first process when a ratio R of the number of pixels C to a total number of pixels T being compared between frames exceeds a first threshold or the second process when the ratio R is less than the first threshold.

6. The system of claim 5, wherein the processor is for selecting the first process including a fallback process.

7. The system of claim 6, wherein the processor is for determining the pixel characteristic of the pixel or group of pixels in the interpolated frame being equal to the pixel characteristic of the corresponding pixel or group of pixels in a preceding frame.

8. The system of claim 6, wherein the processor is for determining the pixel characteristic of the pixel or a group of pixels in the interpolated frame by temporally interpolating between a pixel or group of pixels in frames preceding and succeeding the interpolated frame.

9. The system of claim 6, wherein the processor is for selecting the first process including a combination of a fallback process and a motion compensation interpolation process.

10. The system of claim 9, wherein the processor is for mixing the fallback process and the motion compensation interpolation process based at least in part on the ratio R.

11. The system of claim 6 wherein the processor is for selecting the second process including an only motion compensation interpolation process.

12. The system of claim 1, wherein the processor is for selecting the first process or the second process according to a phase of the interpolated frame relative to the frame preceding the interpolated frame or the frame succeeding the interpolated frame.

13. A system for converting a stream of video frames comprising:
  a video source with the stream of video frames in a first format having at least some frames having motion objects;
  a video output, coupled to the video source, for receiving a stream of new video frames in a second format, wherein the second format includes frames corresponding to the frames of the first format and interpolated frames created based upon the frames of the first format; and
  a processor, coupled to the video output, for:
    receiving the stream of video frames in the first format; and
    determining a pixel characteristic of the at least one pixel in the interpolated frames using the motion object in frames of the first format adjacent to the frame to be interpolated, and
    determining when a number of pixels having the pixel characteristic changing between adjacent frames is more or less than a threshold number of pixels.

14. The system of claim 13, wherein the processor is for determining the pixel characteristic including luminance.

15. The system of claim 14, wherein the processor is for evaluating the pixel characteristic in the frames adjacent the frame to be interpolated for determining the luminance is fading in or out.

16. The system of claim 13, wherein the processor is for determining the pixel characteristic of the at least one pixel in the interpolated frame with motion compensation interpolation when the pixel characteristic is not changing in more than the threshold number of pixels in the adjacent frames.

17. The system of claim 16, wherein the processor is for determining the pixel characteristic of the at least one pixel in the interpolated frame with fallback techniques when the pixel characteristic changing between frames is more than the threshold number of pixels in the frames of the first format.

18. The system of claim 17, wherein the processor is for determining a difference D in the pixel characteristic for at least some of the pixels between frames in the first format.

19. The system of claim 18, wherein the processor is for determining a number of pixels C having the difference D within a pre-selected threshold −W to +W of a peak difference value P for all measured pixels.

20. The system of claim 19, wherein the processor is for selecting a first process for determining the pixel characteristic when a ratio R of the number of pixels C to a total number of pixels T being compared between frames exceeds a first threshold or the second process when the ratio R is less than the first threshold.

21. The system of claim 20, wherein the processor is for selecting the first process including a combination of a fallback process and a motion compensation interpolation process when the pixel characteristic is changing for a threshold number of pixels within the frames.

22. The system of claim 21, wherein the processor is for mixing the fallback process and the motion compensation interpolation process based at least in part on the ratio R.

23. The system of claim 13, wherein the processor is for selecting the first process according to a phase of the interpolated frame relative to the frame preceding the interpolated frame or the frame succeeding the interpolated frame.

24. A method of converting video data arranged into a plurality of frames comprising:
  receiving a stream of the video data in a first format;
  identifying one or more motion objects in the video data in the first format;
  evaluating at least one pixel characteristic of a pixel in one of the motion objects of the video data;
  determining whether a number of pixels having the at least one pixel characteristic of the pixels changing between at least two of the frames is equal to a pre-selected threshold number of pixels;
  interpolating an interpolated frame between the at least two of the frames of the first format stream of the video data to create a second format stream of video data;
  using a first process to determine the pixel characteristic of a pixel in the interpolated frame when the number of the pixels having the pixel characteristics changing between the at least two of the frames is equal to the pre-selected threshold number of pixels; and
  using a second process to determine the pixel characteristic of the pixel in the interpolated frame when the number of the pixels having the pixel characteristics not changing between the at least two of the frames is equal to the pre-selected threshold number of pixels.

25. The method of claim 24, wherein determining whether at least one pixel characteristic of the at least two frames of the video data is changing includes determining the luminance values of the pixels between at least two frames indicates the first format stream of video data is fading in or out between the at least two frames.

26. The method of claim 24, wherein evaluating the at least one pixel characteristic includes evaluating the at least two frames to determine a difference D in the pixel characteristic for at least some of the pixels in the video data in order to select between the first and the second process for determining the pixel characteristic of the pixel in the interpolated frame.

27. The method of claim 26, wherein evaluating the at least one pixel characteristic in the frames of the first format includes determining a number of pixels C having the difference D within a pre-selected threshold −W to +W of a peak difference value P for all measured pixels.

28. The method of claim 27, wherein:
  using the first process includes determining the pixel characteristic of the pixel in the interpolated frame when a ratio R of the number of pixels C to a total number of pixels T being compared between frames exceeds a first threshold; and
  using the second process includes using the second process when the ratio R is less than the first threshold.

29. The method of claim 28, wherein using the first process includes using a fallback process.

30. The method of claim 29, wherein using the fallback process includes setting the pixel characteristic of the pixel in the interpolated frame equal to the pixel characteristic of the pixel in a preceding frame.

31. The method of claim 29, wherein using the fallback process includes determining the pixel characteristic of the pixel in the interpolated frame by temporally interpolating between corresponding pixels in frames preceding and succeeding the interpolated frame.

32. The method of claim 29, wherein using the first process includes using a combination of a fallback process and a motion compensated interpolation process.

33. The method of claim 32, wherein using the combination of the fallback process and motion compensation interpolation process are mixed based at least in part on the ratio R.

34. The method of claim 29, wherein using the second process includes using an only motion compensation interpolation process.

35. The method of claim 24, further comprising:
determining a phase of the interpolated frame; and
using the frame preceding the interpolated frame or the frame succeeding the interpolated frame based on the phase of the interpolated frame for using the first process or the second process.

* * * * *